US008452992B2

(12) United States Patent
Bosisio et al.

(10) Patent No.: US 8,452,992 B2
(45) Date of Patent: May 28, 2013

(54) POWER MANAGEMENT USING CONSTRAINTS IN MULTI-DIMENSIONAL PARAMETER SPACE

(75) Inventors: Stefano Bosisio, Parabiago (IT); Patrick Bellasi, Milan (IT); Matteo Carnevali, San Giorgio su Legnano (IT); David Siorpaes, Cortina d'Ampezzo (IT); William Fornaciari, Parma (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 413 days.

(21) Appl. No.: 12/826,549

(22) Filed: Jun. 29, 2010

(65) Prior Publication Data

US 2011/0320795 A1    Dec. 29, 2011

(51) Int. Cl.
*G06F 1/00* (2006.01)
*G06F 1/32* (2006.01)
*G06F 1/24* (2006.01)

(52) U.S. Cl.
USPC ............................ 713/300; 713/320; 713/100

(58) Field of Classification Search
USPC ............................................................ 713/300
See application file for complete search history.

(56) References Cited

U.S. PATENT DOCUMENTS

| | | | | |
|---|---|---|---|---|
| 6,901,521 B2* | 5/2005 | Chauvel et al. | ............... | 713/300 |
| 6,927,697 B2* | 8/2005 | Yamaguchi | ............... | 340/12.53 |
| 7,222,245 B2* | 5/2007 | Singh | ............... | 713/300 |
| 7,423,383 B2* | 9/2008 | Kawano | ............... | 315/169.4 |
| 7,501,771 B2* | 3/2009 | Kawano | ............... | 315/169.4 |
| 7,747,878 B2* | 6/2010 | Vyssotski et al. | ............. | 713/300 |
| 2003/0204759 A1* | 10/2003 | Singh | ............... | 713/320 |
| 2004/0181700 A1* | 9/2004 | Katoh et al. | ................. | 713/300 |
| 2009/0254660 A1* | 10/2009 | Hanson et al. | ................ | 709/226 |

* cited by examiner

*Primary Examiner* — Suresh Suryawanshi
(74) *Attorney, Agent, or Firm* — Graybeal Jackson LLP

(57) ABSTRACT

An embodiment of a method and system are provided for managing both system resources and power consumption of a computer system, involving different layers of the system: an application layer, a middle layer where the operating system is running and where a power manager is provided, and a hardware layer used for communicating with the hardware devices. Hardware devices have different operating modes which provide distinct trade-offs between performances and power consumption. Performance requirements defined at the level of the application layer, as well as the device power status of the system, set constraints on the system resources. The middle layer power manager may be in charge of retrieving performance requirements in form of constraints set on system parameters, aggregating these constraints opportunely and communicating corresponding information to the device drivers which may then select a best operating mode.

30 Claims, 8 Drawing Sheets

POWER MANAGEMENT USING CONSTRAINTS IN MULTI-DIMENSIONAL PARAMETER SPACE

TECHNICAL FIELD

An embodiment relates to computer systems and in particular to management of power consumption and system resources in a computer system.

BACKGROUND

Power management techniques are used for optimizing power consumption by exploiting hardware power saving features, e.g., clock and power gating or dynamic voltage and frequency scaling offered by most modern chips. However, activating a low power mode impacts system performances and may prevent achieving the desired quality of service (QoS). Several approaches have been provided in the art for balancing energy consumption and performances. However, most of these approaches do not reach the true optimum.

Furthermore, the prior art approaches may lead to a wrong view of the actual resource usage and availability if the resources are used in a competitive way by a plurality of entities. Consequently, this often leads to an incorrect configuration of the system. Moreover, if a hardware limit internal to the computer system is reached due to a high number of resource requests sent by different system entities, the system may behave in an incorrect way providing bad user experience.

Additionally, prior art approaches may be unable to ensure that a required QoS level can be effectively provided. The systems work in a best effort way: a device defines a QoS expectation and hopes that other entities will fulfill it. In the case where one or more entities of the system fail in providing the requested QoS level, other entities which are not aware of this failure will nevertheless try to provide the requested QoS level, and, therefore, possibly consume more power, although the requested QoS level can not be reached anyhow because of the failure of the one or more entities to provide the requested QoS level. This situation may lead to a lack of optimization of the trade-off between performances and power consumption in the system.

SUMMARY

Embodiments are provided for improving the methods and systems of the prior art and overcoming the drawbacks mentioned above. The embodiments provide a system-wide optimization of power consumption and performances in a computer system taking into account requirements provided by an application layer.

According to an embodiment, there is provided a method for dynamically managing power consumption and system resources at a power manager in a computer system, the method comprising: retrieving a set of regions in a multi-dimensional parameter space, each region relating to an operating mode of at least one of a plurality of device drivers; identifying one or more sub-regions of said regions in said multi-dimensional parameter space, the sub-regions relating to operating modes of all the device drivers in the plurality; retrieving a set of constraints from an application layer of the computer system, the constraints being defined in said multi-dimensional parameter space; determining sub-regions, among the one or more identified sub-regions, complying with the set of constraints; selecting one of the determined sub-regions to specify parameters for the plurality of device drivers to operate; and notifying the plurality of device drivers of the selected sub-region.

According to another embodiment, there is provided a computer-readable medium for dynamically managing power consumption and system resources in a computer system, the computer-readable medium comprising computer-executable instructions for a power manager that, when carried out by a processor on which the power manager is running, cause the processor to perform the steps of: retrieving a set of regions in a multidimensional parameter space, each region relating to an operating mode of at least one of a plurality of device drivers; identifying one or more sub-regions of said regions in said multidimensional parameter space, each sub-region being at an intersection of a given plurality of regions of the set of regions, each given plurality of regions including at least one region for each device driver of the plurality of device drivers; retrieving a set of constraints from an application layer of the computer system, the constraints being defined in said multidimensional parameter space; aggregating the retrieved constraints; determining sub-regions, among the one or more identified sub-regions, complying with the aggregated constraints; selecting one of the determined sub-regions according to an optimization policy; and notifying the plurality of device drivers of the selected sub-region to specify parameters for the plurality of device drivers to operate.

According to still another embodiment, there is provided a system for dynamically managing power consumption and system resources in a computer system, the system comprising: a plurality of device drivers, each device driver being adapted to notify to a power manager at least one region in a multidimensional parameter space, each region relating to an operating mode of at least one device driver; and the power manager, adapted to: identify one or more sub-regions of said regions in said multidimensional parameter space, the sub-regions relating to operating modes of all the device drivers in the plurality; retrieve a set of constraints from an application layer of the computer system, the constraints being defined in said multidimensional parameter space; aggregate the retrieved constraints; determine sub-regions, among the one or more identified sub-regions, complying with the aggregated constraints; select one of the determined sub-regions to specify parameters for the plurality of device drivers to operate; and notify the plurality of device drivers of the selected sub-region, wherein each device driver of the plurality is further adapted to apply an operating mode corresponding to the notified sub-region.

BRIEF DESCRIPTION OF THE DRAWINGS

The accompanying drawings are incorporated into and form a part of the specification for the purpose of explaining the principles of the embodiments. The drawings are not to be construed as limiting the embodiments to only the illustrated and described embodiments of how they can be made and used. Further features and advantages will become apparent from the following and more particularly from the description of the embodiments, as illustrated in the accompanying drawings, wherein.

DETAILED DESCRIPTION

Figure 1:
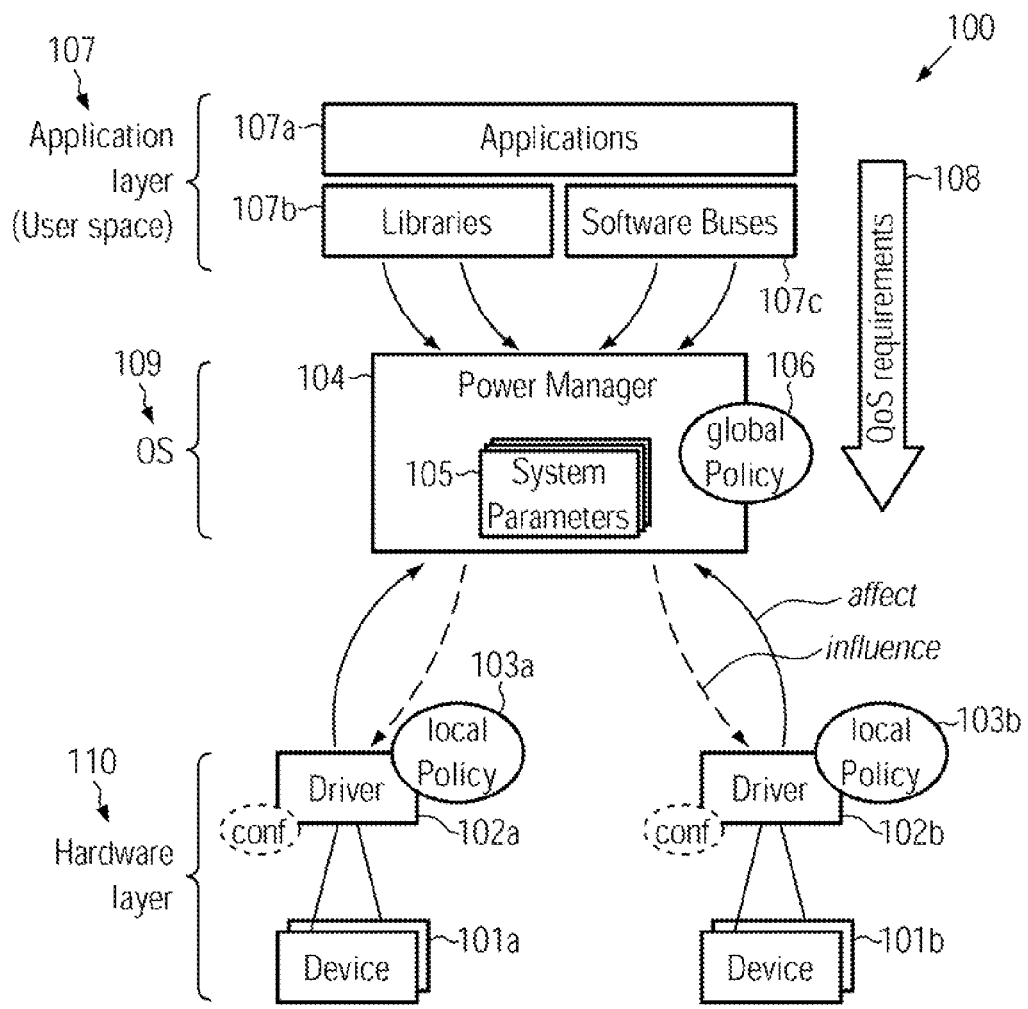
FIG. 1 is a functional block diagram illustrating an embodiment where a power manager at the middle layer interacts with an application layer and a hardware layer.

The illustrative embodiments will be described with reference to the figure drawings wherein like elements and structures are indicated by like reference numbers.

Embodiments provide a method and system to manage both system resources and power consumption of a computer system, involving different layers of the system: an application layer, a middle layer where the operating system is running and where a power manager (PM) is provided, and a hardware layer used for communicating with the hardware devices. Hardware devices have different operating modes which provide distinct trade-offs between performances and power consumption. Performance requirements defined at the level of the application layer, as well as the device power status of the system, set constraints on the system resources. According to embodiments, the middle layer power manager is in charge of retrieving performance requirements in form of constraints set on system parameters, aggregating these constraints opportunely and communicating corresponding information to the device drivers, which can then select a best operating mode.

Embodiments therefore allow optimizing a trade-off between the power consumption and the performances of the overall computer system, by tracking interdependencies between the sub-systems at both the application layer and the hardware layer.

Furthermore, according to embodiments, a new way of aggregating constraints from the application layer is provided, which provides information on the actual resource usage and on the availability of the resources of the system, especially when the resources are used in a competitive way by a plurality of entities (device drivers or applications). Moreover, embodiments allow tracking an event where a hardware limit internal to the computer system may be reached due to a high number of resource requests from different system entities.

Before describing in more detail embodiments in the light of the accompanying figures, a definition of concepts which are used throughout this description is provided.

In the present description, the terms "system", "computer system" and "platform" are all used as synonyms referring to any type of computer system, comprising both hardware components and software components. In an embodiment, the computer system has a power source, e.g., a battery, which may provide a limited quantity of energy. In another embodiment, the computer system may be connected externally to a power source, e.g., plugged into the electric network. Both embodiments may be combined in a conventional manner.

In embodiments, hardware components (also called "devices") may comprise all hardware components necessary for the operation of the computer system as well as internal and/or external (e.g., "plugged-in" or connected through a wireless network) hardware components which provide further abilities to the computer system. Examples of external components may be a mouse, a keyboard, a printer, a webcam, a scanner, a camera, and any other component which may be connected to the computer system according to any communication protocol.

In embodiments, the computer system is split into three abstract layers: an application layer, an OS layer, and a hardware layer. The application layer, which is also called user space, comprises any type of application running on the computer system, on top of the OS. In an embodiment, the application layer may also include libraries and software buses. At the OS layer, which is also called the middle layer, the OS, which is a special software component, establishes a connection between the components of the application layer and the components of the hardware layer. The hardware layer comprises all the (internal and/or external) hardware components. In an embodiment, the hardware layer also comprises a plurality of device drivers, which are software components which may be called by the OS of the computer system in order to establish a communication between the computer system and the hardware components.

In the present description, the term "entity" encompasses components of the application layer as well as device drivers of the hardware layer.

Finally, the terms "performances", "quality of service (QoS) requirements" and "constraints" are used alternatively for describing a single concept in different contexts. "Performances" of a computer system encompass, in an embodiment, all the operations performed by any component of the computer system in a way advantageous for a user. Optimizing the performance of a component will depend on the type of the components. In exemplary embodiments for optimizing performance, the speed of response of an application or of a hardware component may be optimized, or the brightness or resolution of a display, or the quality of voice recognition, and the like. In a general way, optimizing the performances of a computer system means optimizing the user friendliness of the whole system. Following the context of optimizing specific performances, a minimum level of performances may be required by one or more components of the computer system. Such a requirement is referred to as being a "QoS requirement" set by the corresponding one or more components. It is to be understood that setting a QoS requirement sets "constraints" on the whole computer system, which have to be taken into account in the overall configuration of the computer system, e.g., by determining which operating modes (complying with these constraints) should be used by each of the device drivers.

Turning now to FIG. 1, a system 100 for power and performance management according to an embodiment will be described in detail. The power consumption management system 100 may include a power manager 104, located in the middle layer 109 (corresponding to the layer where the operating system of the computer system is running), and adapted to aggregate a plurality of constraints from the application layer 107 and to apply these constraints to operating modes known to be available at the hardware layer 110. In an embodiment, the constraints may include QoS requirements 108 coming from the application layer 107. In an embodiment, the power manager 104 may command the device drivers 102a, 102b of the hardware layer 110 to each use a specific operating mode for operating the devices 101a, 101b, respectively.

In an embodiment, the application layer 107 encompasses running applications 107a as well as libraries 107b and software buses 107c. The QoS requirements 108 may be sent by any of the applications 107a, the libraries 107b or the software buses 107c. In an exemplary embodiment, QoS requirements 108 may be retrieved from the application layer via instrumentation and analysis of common standard libraries (e.g., libc) and via analysis of message exchanges between applications and the OS, and among applications on software buses (e.g., D-Bus). The drivers 102a and 102b may send information to the power manager 104 on their operating modes. Indeed, although each of the drivers 102a, 102b may be able to optimize the performances of the corresponding device and/or the corresponding power consumption according to a local policy 103a, 103b, the drivers may be unaware of the power consumption of other drivers and would therefore not be able to optimize the whole system. For this purpose, in an embodiment, a global policy 106, is used which may be aware of all the hardware operating modes of the device drivers as well as of all the QoS requirements 108 coming from the application layer 107. Therefore, the global policy 106 may only be fully applied at the middle layer 109, where the power manager 104 is running, and where all information (i.e., operating modes and constraints) coming from both the hardware layer and the application layer are gathered. This information is represented by the system parameters 105 within the power manager 104.

Figure 2:
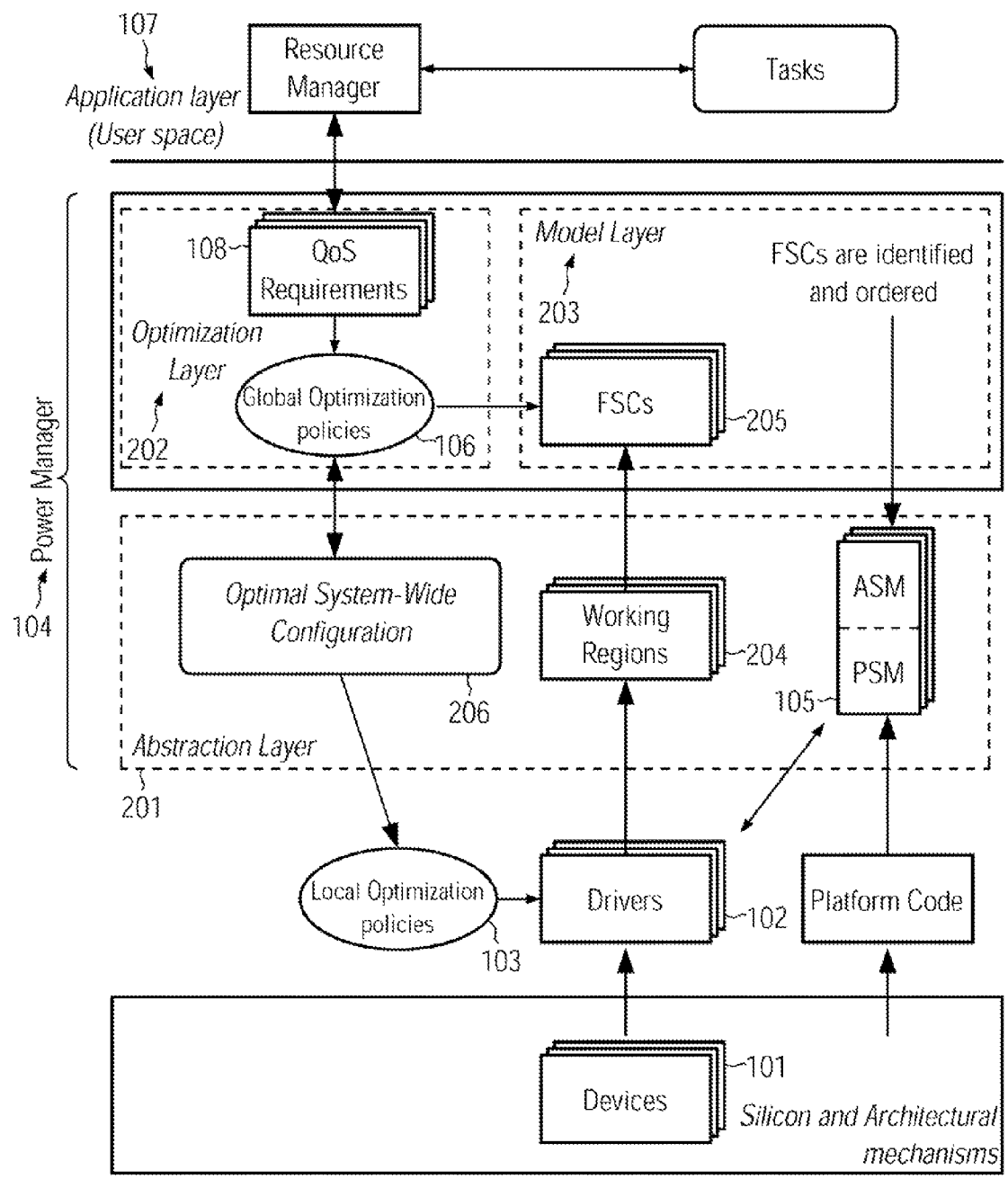
FIG. 2 is a functional block diagram illustrating an embodiment where a power manager comprises an abstraction layer, an optimization layer and a model layer.

Turning now to FIG. 2, a detailed view of the computer system 100 and its power manager 104 is depicted according to an embodiment. The devices 101 and the corresponding device drivers 102 correspond to the devices 101a, 101b and the device drivers 102a, 102b of FIG. 1, respectively. The local optimization policies 103 of the drivers correspond to the local policies 103a, 103b of FIG. 1. According to an embodiment, the power manager 104 is split into three distinct layers according to a formal model. The goal of such a layered framework is to identify an optimal system-wide configuration considering together the QoS requirements, the availability of the system resources, and interdependencies among entities (drivers and applications). The layered framework implements a hierarchical distributed control model including an abstraction layer 201, an optimization layer 202, and a model layer 203.

In an embodiment, the abstraction layer 201 may provide a well-defined abstraction interface from the underlying platform, which is used to represent resources availability and devices interdependencies. Several abstractions are defined at the level of the abstraction layer: working regions 204, which are also called device working regions (DWRs), and system-wide metrics (SWMs) 105. A DWR is a representation of an operating mode of a device driver. The SWMs are parameters abstracting the system resources, which may be used to assert both the operating modes of device drivers and the QoS requirements coming from the application layer. In other words, these parameters are information shared at a same abstraction level among the entities of a system (applications and device drivers). In particular, in an embodiment, the DWRs may be represented as regions or points within a multi-dimensional parameter space defined by the SWMs.

In an exemplary embodiment, hardware components (and their corresponding device drivers) like accelerators (audio and video) are considered, that may provide different performances when they are powered and clocked at different voltages and frequencies. These components may dynamically assert constraints on the various system clocks and power voltage level in the various domains (system clocks and power levels represent the PSMs in this example). As a consequence of this, other devices in the system, like phase-locked loops (PLLs) may have to reconfigure themselves to ensure that these constraints can be satisfied. In this exemplary embodiment, PLLs, or groups of PLLs, may be considered as devices of the system with their own DWRs. In an embodiment, each value of frequency that a PLL can provide is a DWR of the PLL.

Furthermore, in an embodiment, QoS requirements may be expressed by entities as functions of a plurality of SWMs, and may therefore be represented in the same multi-dimensional parameter space as the DWRs. In particular, in an embodiment, the QoS requirements may be represented by functions defining a lower or an upper bound in the multi-dimensional parameter space. A detailed description of the multi-dimensional parameter space and examples of DWRs and QoS requirements (represented as constraints) within this space will be given in reference to FIGS. 7 to 10.

In an embodiment, two different types of SWMs 105 are considered. The first type refers to abstract system-wide metrics (ASMs), which depend on the way the computer system is used. Corresponding QoS requirements may be expressed according to a current situation of use. In exemplary embodiments, ASMs refer to the ambient light, the noise level in the room, the power source of the platform, and the like. The second type refers to platform system-wide metrics (PSMs), which are architecture dependent and specific to the computer system on which the hardware layer and the application layer are implemented. Examples of PSMs are system latency, bandwidth on hardware buses, bandwidth on network interfaces, and the like.

Since multiple entities may assert QoS requirements as functions of the SWMs, an aggregation operation may be required in an embodiment, to identify a restricted set of constraints on the metric. The aggregation function depends on the nature of the metrics, which, in an embodiment, is split into two types. An SWM is said to be of type "restrictive" when a plurality of constraints defined with respect to this SWM apply in parallel without interfering one with the other. In such a case, the constraints are aggregated with a maximum or a minimum function, since the most restrictive constraint encompasses all the other constraints of this type and is therefore sufficient for representing all these constraints in the multi-dimensional parameter space. Examples of restrictive SWMs are latencies and timeouts. On the contrary, SWMs are said to be of type "additive" when the corresponding QoS requirements are applied in a competitive way for a single resource, which has to be shared between all the entities defining QoS requirements on this SWM. In that case, the constraints corresponding to the QoS requirements have to be aggregated through an addition, since the overall constraint on the system is obtained by the sum of all the constraints set on the shared resource. Examples of additive SWMs are bandwidths and throughputs. In an embodiment, both the ASMs and PSMs can be of type "additive" or "restrictive".

Turning now to the model layer 203 of the power manager 104 on FIG. 2, this layer builds a platform-independent model of the system capabilities, which is based on the abstractions (DWRs and SWMs) provided by the abstraction layer detailed above. In an embodiment, the model layer may provide a system-wide view of the specific platform capabilities which is built automatically by the power manager based on the elementary information available through the abstraction layer. In particular, the model layer may identify automatically feasible system configurations (FSCs) 205, on the basis of the DWRs obtained in the abstraction layer, as will be described in detail below in reference to FIG. 8. The FSCs may be understood as a representation, in the multi-dimensional space mentioned above, of operating modes available to all device drivers in use on the computer system. Once identified, in an embodiment, the FSCs are also ordered at the level of the model layer. According to an embodiment, they are ordered according to a given global optimization policy 106, as will be detailed below.

Finally, in an embodiment, the power manager 104 may comprise an optimization layer 202 which may implement a completely platform-independent optimization strategy by exploiting both the system model defined at the model layer and the constraints collected by the application layer. In particular, in an embodiment, the QoS requirements 108 received from the application layer may be combined with the FSCs obtained and ordered in the model layer, and a global optimization policy 106 may be applied for selecting an optimized system-wide configuration 206 which complies with both the hardware operating modes represented by the FSCs 205 and the QoS requirements 108.

In an embodiment, the optimized system-wide configuration 206 is an FSC. It pertains to the abstraction layer 201 since it is specific to the platform on which the optimization policy is applied. According to an embodiment, the optimized system-wide configuration, or corresponding information, may be provided to the local optimization policies 103 of the device drivers 102, in order to allow the drivers to tune their own parameters in such a way that they will operate in a mode complying with the optimized system wide configuration 206. As the local optimization policies 103 are applied at the level of the drivers 102 on top of the solution for global optimization found by the power manager 104, the corresponding embodiment provides the best optimization of the operating modes of all the device drivers for the whole computer system in function of a specific use (defined through the QoS requirements 108 in combination with a given global optimization policy 106) in the specific conditions of use defined by the SWMs 105.

Figure 3:
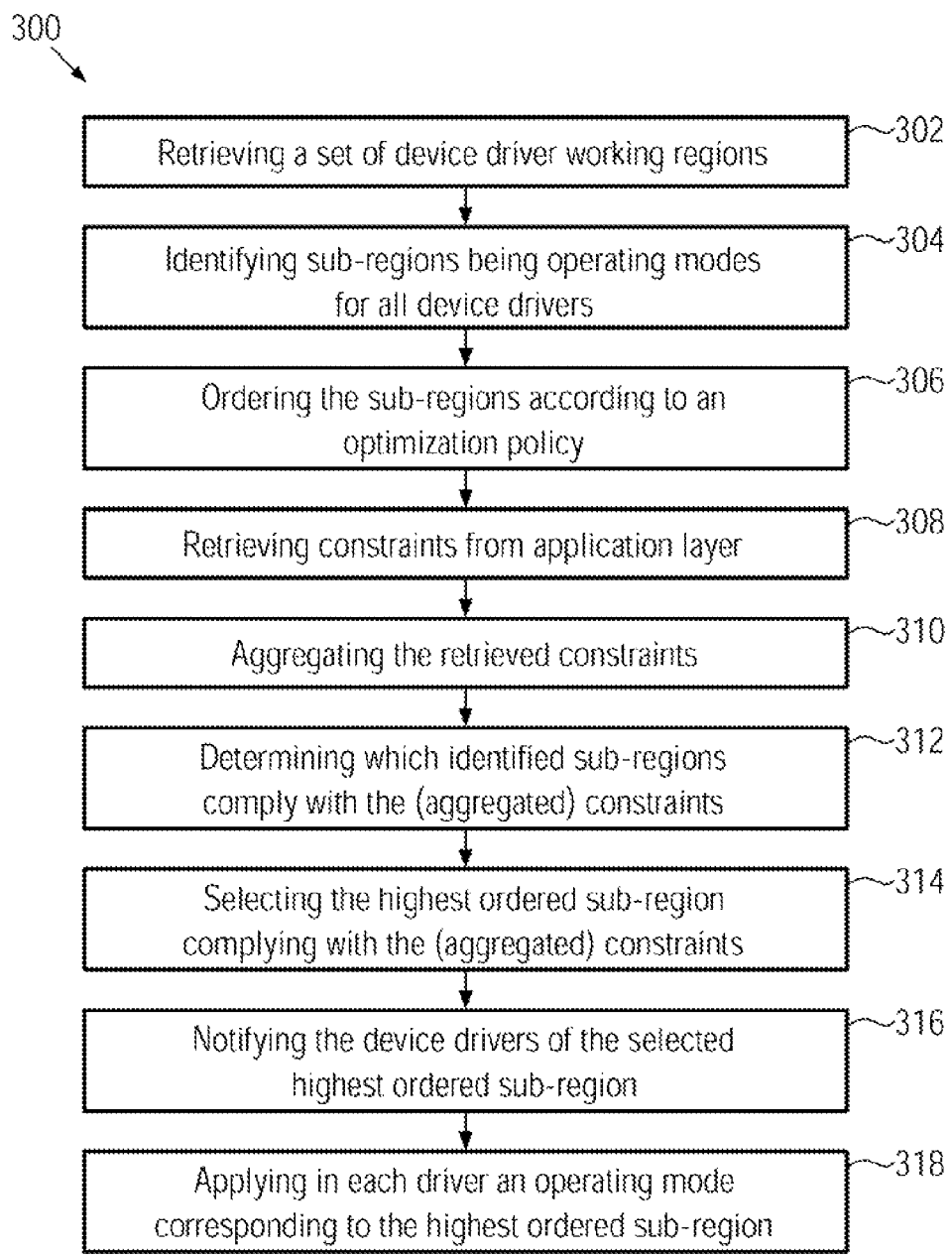
FIG. 3 is a flow chart illustrating a method for dynamically managing power consumption and system resources, according to an embodiment.

FIG. 3 is a flow chart describing a method for dynamically managing power consumption and system resources at a power manager in a computer system, according to an embodiment. The method of FIG. 3 will be described in detail in relation with the elements of the system previously described in FIGS. 1 and 2.

In step 302, a set of regions in a multi-dimensional parameter space is retrieved, where each region represents an operating mode of at least one of a plurality of device drivers. In an embodiment, the retrieved regions are the device working regions (DWRs) 204 described in relation to FIG. 2, and the multi-dimensional space is the space defined by the plurality of SWMs of the system, also described in relation to FIG. 2. According to an embodiment, the DWRs of each device driver 102a, 102b are retrieved by the power manager 104. In another embodiment, the device drivers 102 themselves, which embed a mapping between their operating modes and the SWMs of the system, register their DWRs at the power manager 104. In an embodiment, the registered DWRs may be stored in a memory accessible by the power manager. Further details on the DWRs will be given below in reference to FIG. 7.

At step 304, one or more sub-regions of the DWRs are identified in the multi-dimensional parameter space. In an embodiment, the identified sub-regions are at an intersection of at least one DWR per registered device driver, so that any of these sub-regions encompasses values of the parameter space where all the registered device drivers of the computer system are able to operate. In other words, any of the identified sub-regions relates to an operating mode of all the device drivers of the system, since all the device drivers are able to tune their internal parameters to values located within the identified sub-regions.

It is assumed that at least one sub-region will be identified at step 404, otherwise it means that there may be an incompatibility between several devices used within the computer system.

In an embodiment and using the language of FIG. 2, the identified sub-regions may correspond to the feasible system configurations (FSCs) 205 defined above. The identification of the FSCs from the set of DWRs registered by the drivers or retrieved by the power manager will be explained in more details in reference to FIG. 8.

At optional step 306, the sub-regions (i.e., FSCs) previously identified may be ordered by the power manager 104 according to a global optimization policy 106. The global optimization policy allows optimizing both performances (in terms of QoS requirements) and power consumption of the computer system. In one embodiment, the global optimization policy defines an ordering of the identified FSCs according to QoS requirements. Accordingly, the highest ordered FSC may correspond to the best quality of service available on the computer system. In an embodiment, the other FSCs may also be pre-ordered at this optional step 306 according to the overall quality of service they provide for the system. In these embodiments, it may happen that the highest ordered FSC is the one with the highest power consumption, since the power consumption is not taken as a criterion for ordering the FSCs according to this global optimization policy. Such a policy may be used in cases where power consumption is not a draw-back, i.e., when a battery of the computer system is fully charged or when the computer system is powered by a continuous power source (e.g., plugged into the electric network).

In another embodiment, the global optimization policy orders the identified FSCs according to power consumption optimization. In that case, the highest ordered FSC will be the one corresponding to an operating mode for all the device drivers which allows the whole computer system to consume as little energy as possible. The other FSCs may be ordered accordingly, until the last one which is the highest power consuming, although this last operating mode may provide far better quality of service than the highest ordered FSC according to this global optimization policy. It is to be understood that such a global optimization policy may be complementary to the one of the previous embodiment, and may be used especially in cases where it is important to reduce power consumption for increasing the autonomy of the computer system or in a case where the battery level is low.

In still another embodiment, the global optimization policy 106 orders the identified FSCs according to a trade-off between QoS requirements and power consumption optimization. In this embodiment, several alternative global optimization policies may be used between the two extreme ones described in the two previous embodiments. For example, a certain level of quality of service may be required, but not set to a maximum of the available quality of service, in order to save power, or an upper limit may be set to the power consumption, therefore necessarily limiting the quality of service available accordingly.

It is to be understood that the different embodiments mentioned above for the global optimization policy are only examples of policies which can be used in relation to the embodiments. Other policies, which would provide more detailed requirements like a specific level of quality of service for specific applications, and at the same time limiting the power consumption for other applications, may be used as well. Indeed, it may be important for applications related to audio or video to provide a minimum quality of service at any time of the use of the computer system, independently of the battery level, whereas some other applications, e.g., an antivirus application scanning the memory of the whole system, may be forced in an idle mode for saving power when the battery level of the system becomes low (e.g., by reaching a minimum threshold).

Furthermore, it is to be understood that all the embodiments described above regarding specific global optimization policies may be combined in a single computer system, in a further embodiment. Indeed, several distinct policies may be used at different times, according to the needs of the user and the level of the battery. For example, a global optimization policy ordering the identified FSC according to the best quality of service may be used each time the computer system is connected to an external power system, and optimization policies taking the battery level into account may be used when the computer system is powered only by the battery. Furthermore, several distinct global optimization policies may be used for different ranges of values of the battery level. In this case, in an embodiment, the FSCs may be pre-ordered according to alternative optimization policies at optional step 306. The alternative results for the pre-ordering may be stored in a memory during a configuration phase in an embodiment, as will be discussed in more details in relation with FIG. 5.

At step 308, during a run-time phase of the computer system where one or more applications are running in an application layer, the power manager may retrieve a set of constraints from the application layer 107. In an embodiment, the constraints may be retrieved from one or more running application 107a of the application layer. In another embodiment, the constraints may be retrieved from common libraries 107b of the application layer 107. In still another embodiment, the constraints may be retrieved from software buses 107c of the application layer 107. Other constraints from any other component of the application layer 107 may also be retrieved by the power manager, and all these embodiments may be combined together. In an embodiment, the constraints retrieved from the application layer 107 are the QoS requirements 108, which define a minimal level of available performances for each running application, common library and/or software buses providing constraints to the power manager. In an embodiment, all the constraints retrieved from the application layer 107 may be defined in the same multi-dimensional parameter space as the one in which the FSCs of the system have been identified.

At step 310, the power manager 104 may determine which FSC among the ones which have been identified at step 304 and optionally ordered at step 306, are complying with the constraints retrieved from the application layer at step 308. Indeed, in an embodiment, the constraints set by the application layer may exclude one or more FSCs among the previously identified ones, which would not provide sufficient performances for the current state of the application layer.

In an embodiment, the constraints provided by the components of the application layer 107 (i.e., at least the applications 107a, the common libraries 107b and the software buses 107c) may be independent from one another, i.e., they may define upper or lower bounds on different parameters (i.e., SWMs) of the multi-dimensional parameter space. On the contrary, other constraints of the set of constraints from the application layer may apply to the same one or more parameters. In that case, these constraints may be aggregated in optional step 310 before being applied to the identified FSCs. In an embodiment, constraints of "restrictive" type, which are based on one or more same parameters, but which are not using given limited resources of the system in a competitive way, may be aggregated using a minimum/maximum function. Therefore, the only constraints which will be applied in the parameter space in this embodiment will be the most restrictive ones of the set of constraints, and they define either an upper bound or a lower bound in the parameter space. In another embodiment, where the constraints based on one or more common parameters are using limited resources of the system in a competitive way, i.e., when there are of "additive" type, an aggregated constraint will be computed, being the sum of all the additive constraints using the same limited resource in a competitive way.

At step 312, it is determined which identified FSCs comply with the retrieved (and optionally aggregated) constraints. This step will be discussed in further details in relation with FIG. 9.

Once the remaining FSCs which comply with all the constraints have been determined, an FSC complying with the retrieved constraints is selected at step 314. In an embodiment, the selected FSC may be the highest ordered FSC identified according to the ordering of the FSCs at optional step 306. As discussed above, the ordering of the FSCs depends on the global optimization policy 106 currently applied to the system. However, in other embodiments, the FSC may be selected according to any other criterion.

At step 316, all the device drivers registered at the power manager are notified of the selected highest ordered subregion. In an embodiment, information on the selected FSC is sent by the power manager to all the device drivers. In an alternative embodiment, each device driver is notified by the power manager of its own DWR corresponding to the selected FSC. This step may be performed using any communication protocol available between the respective device drivers 101 and the power manager 104.

Finally, upon reception of the information relating to the selected highest order FSC at step 318, each device driver may tune itself in order to operate in the required FSC, i.e., in its corresponding operating mode. As explained above, in an embodiment, any identified FSC corresponds to an intersection between at least one working region (DWR) for each device driver registered in the system, so that selecting an FSC ensures that all the device drivers may tune themselves in order to operate in an operating mode corresponding to the selected FSC. As the selected FSC has been previously determined to comply with the constraints from the application layer in step 312, and as it is further the highest ordered FSC remaining after applying the constraints, according to the step 314, the fact that the power manager 104 enforces all the device drivers to operate in an existing operating mode which corresponds to the selected FSC may ensure that the whole system is optimized in the sense of the global optimization policy which has been used for ordering the FSCs. Again, this embodiment ensures a system-wide optimization of the computer system taking into account both the hardware limitations from the device drivers and the QoS requirements from the application layer, as well as any interdependency between the requirements, and selects the unique optimal solution according to a given global optimization policy at any time where the computer system is running.

Furthermore, it becomes clear from the embodiment described above in relation to FIG. 3 that this optimization method may be applied dynamically, at run-time. For example, if a new application is launched in the application layer, the power manager may reiterate the method at step 308 in order to retrieve the supplementary constraints coming from the new running application, optionally aggregate them to the previously retrieved and aggregated constraints at step 310, determine again which identified FSCs comply with the new aggregated constraints at step 312, and, if necessary, perform again steps 314 to 318 in the case where the set of FSCs complying with the new aggregated constraints differs from the previously determined set of FSCs. Similarly, in the case where a running application would be closed, the corresponding constraints may be removed by the power manager at step 301, and the remaining constraints may be optionally re-aggregated at step 310. The new set of identified FSCs complying with the new (aggregated) constraints may be determined again at step 312, and steps 314 to 318 may be performed again if necessary, in the case where the new set of determined FSCs differs from the previous one.

Similarly, in the case where a new device is added at run-time to the computer system, a corresponding device driver may register itself at the power manager, and at least steps 302 to 306 of FIG. 3 may be repeated for determining the new FSCs of the system and optionally reordering the FSCs according to an optimization policy. In the case where the previously used FSC would not be available anymore due to the presence of the new device, this may be discovered at step 304, and a new optimized FSC may be provided to all the device drivers for optimizing dynamically the whole computer system in its new configuration. Similarly, in the case where a device would be powered off at run-time, its DWRs would not be restrictive anymore for the whole system, and the method of FIG. 3 may be repeated for possibly discovering a new FSC, which may allow optimizing even more the whole system at run-time in its new configuration. In an embodiment, new devices which may be powered on or powered off at run-time at the computer system may be plug and play devices.

Figure 4:
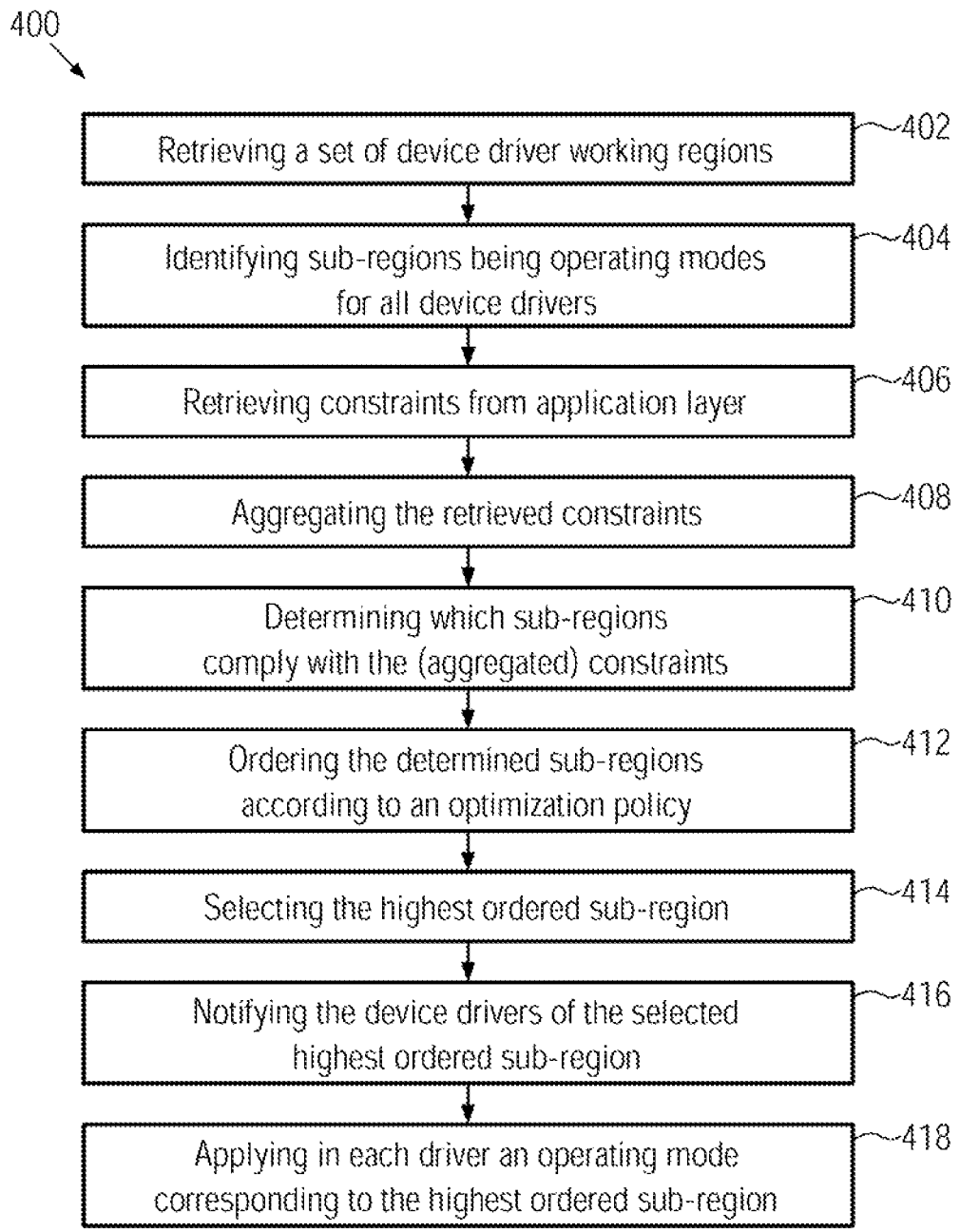
FIG. 4 is a flow chart illustrating a method for dynamically managing power consumption and system resources, according to another embodiment.

Turning now to FIG. 4, it relates to a method 400 for dynamically managing power consumption and system resources at a power manager in a computer system, according to an embodiment. It differs from the method of FIG. 3 in that the optional step of ordering the sub-regions according to an optimization policy is not performed during a configuration phase at which the FSCs of the system are identified. Steps 402 and 404 correspond to steps 302 and 304, respectively, and will not be detailed again. Then, at step 406, the constraints from the application layer may be retrieved, as it was made in step 308 of FIG. 3. If necessary, the constraints are aggregated at step 408, with the same embodiments as the one described in relation with step 310 of FIG. 3. Then, at step 410, all the FSCs complying with the retrieved aggregated constraints are determined. Then, an optional step 412 of ordering the determined FSCs complying with the constraints according to a global optimization policy is performed. Once the FSC have been ordered, the highest ordered FSC may be selected at step 414, which corresponds to step 314 of FIG. 3. Finally, steps 416 and 418 correspond to steps 316 and 318 of FIG. 3.

It is understood that, as in the case of FIG. 3, the ordering step 412 is optional. Indeed, in other embodiments, a FSC may be selected which is not based on a given ordering of the FSCs, but rather on any other criterion for selecting an FSC.

An advantage of ordering the FSCs only after having determined which FSCs comply with the retrieved aggregated constraints is to order fewer FSCs than would be the case in the configuration phase (see step 306 of FIG. 3), since all the available FSCs of the whole system were considered and ordered at step 306 of FIG. 3. On the contrary, in the embodiment of FIG. 4, only the FSCs which comply with the aggregated constraints from the application layer are considered and ordered at step 412. However, in the embodiment of FIG. 4, it may be necessary to reorder the FSCs each time a new application is launched or an application is closed. On the contrary, in the embodiment of FIG. 3, a pre-ordering of the FSCs, which was performed in the configuration phase, may be used for selecting a highest order FSC at any time when some changes occur in the application layer. In the embodiment of FIG. 3, it was also possible to store the ordering of the FSCs according to several alternative optimization policies, which may be used one after the other according to system properties like the battery level. On the contrary, in the embodiment of FIG. 4, it is not necessary to store any pre-ordering of the FSCs, therefore sparing space in the memory, but the cost for sparing this memory is to compute again the ordering of the FSCs currently complying with the constraints from the application layer each time a new optimization policy has to be used.

Figure 5:
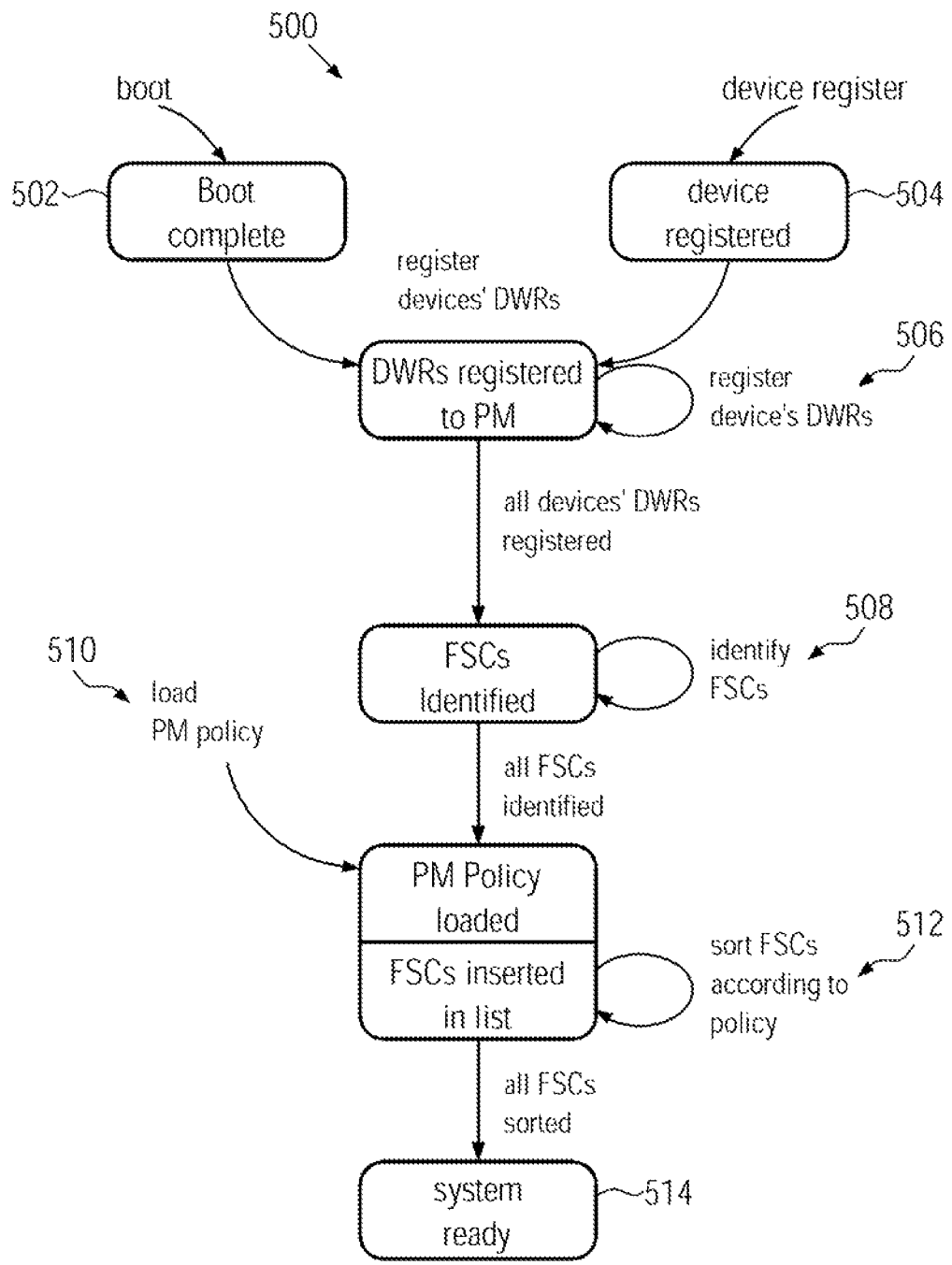
FIG. 5 is a block diagram illustrating a configuration phase of a computer system, according to an embodiment.

Turning now to FIG. 5, it relates to a further embodiment, where a configuration phase for the identification of the FSCs of the whole system and the ordering of the FSCs according to a global optimization policy is described in more detail. In detail, once the boot of the system is complete at step 502, and all the devices pertaining to the system are registered at step 504, the devices or their device drivers register their DWRs to the power manager. In an embodiment, the devices are registering their DWRs in a loop one after the other at step 506. In another embodiment, all the devices register their DWRs to the PM in a competitive way, and the quickest device is registered first. In any case, step 506 is repeated until all the devices have registered all their DWRs. Then, at step 508, the FSCs of the system are identified. This may be done in the same way and with the same embodiments as detailed above, and is shown in more details in reference to FIG. 8. Then, once all FSCs have been identified, a global optimization policy may be loaded at the power manager 104. In an embodiment, the global optimization policy is chosen by a user of the computer system. In another embodiment, it is automatically determined among a plurality of policies, on the basis of specific parameters of the whole system, like the level of the battery, the light level in which the computer system is used, the ambient noise, and the like, or a combination of these parameters. Once the global optimization policy 106 is loaded at the power manager, the identified FSCs are sorted according to this policy at step 512. This corresponds to the embodiment described in relation to FIG. 3, where all the FSCs of the system (which have been identified at step 508) are sorted during the configuration phase, without taking into account the constraints coming from the application layer at this step. Finally, once all the FSC, have been sorted and once this ordering has been stored in a memory, the system is ready to be used according to an embodiment, at step 514.

Figure 6:
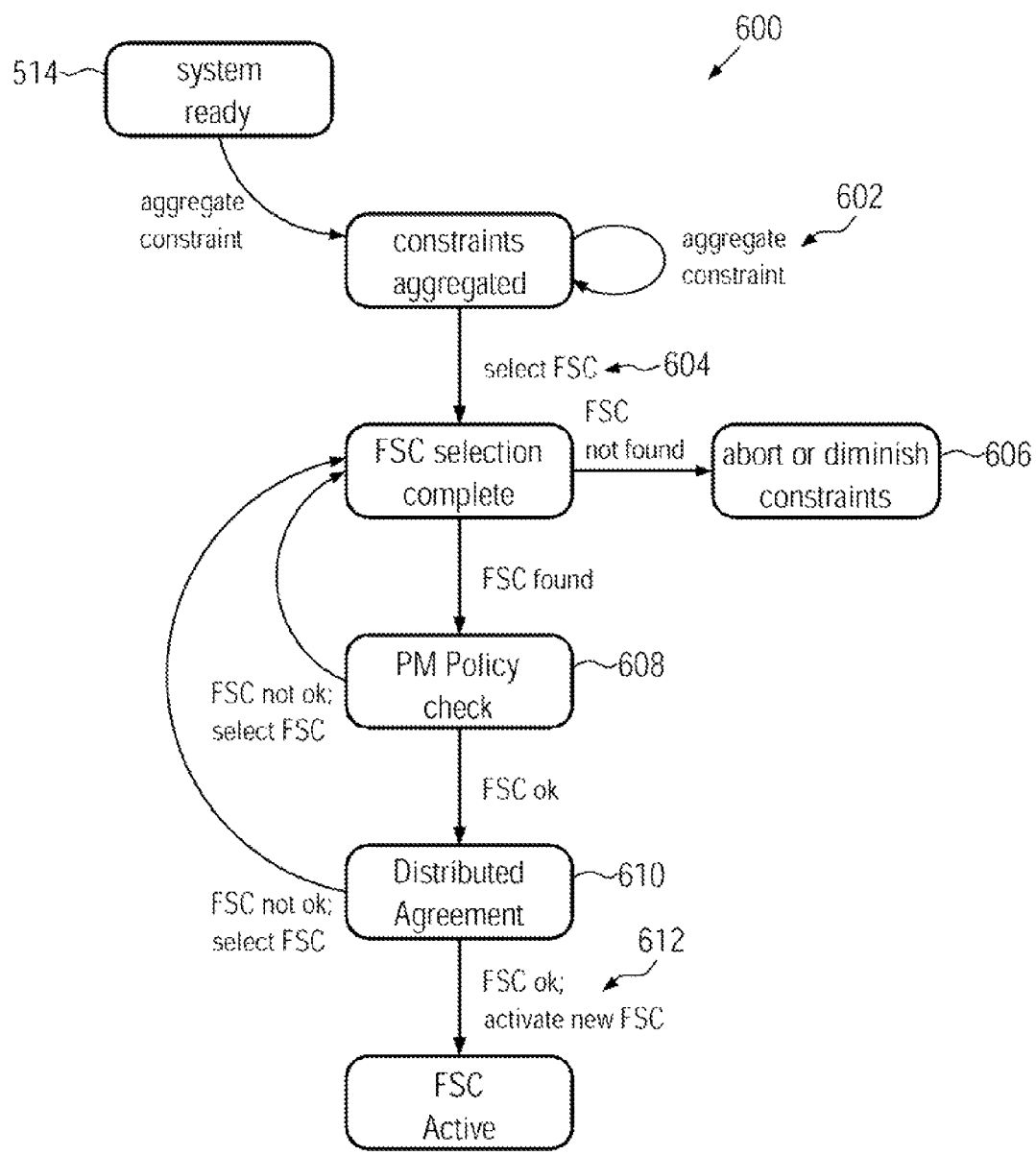
FIG. 6 is a block diagram illustrating a run-time phase of a computer system, according to an embodiment.

Turning now to FIG. 6, it relates to an embodiment, where a run-time phase follows the configuration phase described in relation to FIG. 5. The method according to this embodiment begins at step 514, which corresponds to the final step of FIG. 5, where the system is ready to be used according to an embodiment. At step 602, constraints are retrieved from the application layer in a way similar to the way discussed in relation to step 308 of FIG. 3. In the embodiment of step 602 of FIG. 6, the constraints are retrieved and aggregated to the previously retrieved ones in a loop, one after the other. This represents an alternative embodiment to the steps 308 and 310 of FIG. 3, where all the constraints were retrieved before they were aggregated together. Nevertheless, any of the two embodiments may be combined with the further embodiments described in relation with FIG. 6. At step 604, one FSC is selected. In an embodiment, the selected FSC is the highest ordered FSC according to the ordering of step 512 of FIG. 5, which also complies with the aggregated constraints obtained at steps 602. However, in an alternative embodiment, the FSC may be selected on the basis of any other criterion at step 604. In the case where the constraints aggregated at step 602 would exclude all the FSCs previously identified, this would mean that the system cannot operate at the required quality of service corresponding to the aggregated constraints, since no operating mode available for all the devices of the computer system would match the constraints coming from the application layer. In that case, the method continues at step 606, and in an embodiment, the system aborts. In another embodiment, the system may notify the user that the current QoS requirements cannot be provided. In this embodiment, the user may have several solutions for lowering the QoS requirements by e.g., closing an application or accepting that an application operates at a lower quality of service level. In another embodiment, the system may automatically remove one or more constraints from the application layer until the power manager identifies an available FSC. The power manager may then notify the user of the restrictions made at the level of the application layer required for operating at the identified FSC. In that case, the user may either accept the lower QoS level or e.g., close an application for possibly allowing the power manager to find an FSC complying with the new aggregated constraints. All these embodiments or any combination of them or any alternative for lowering the constraints or for rendering new FSCs available are encompassed in step 606. For example, the user may also connect the computer system to a continuous power network to eliminate a constraint due to the battery level. In that case, new operating modes may be available, and new FSCs may be identified that comply with the aggregated constraints.

If a FSC is found to comply with all the constraints, in an embodiment, which is an alternative to the optional pre-ordering of the FSCs discussed above, the power manager may perform a policy check at step 608. If the FSC found does not comply with the policy, another FSC is selected at step 604. If no further FSC can be found, the method finishes again at step 606 detailed above. However, if the found FSC complies with the policy check of step 608, the FSC is provided to all the device drivers, which then perform a distributed agreement at step 610. In an embodiment, if the device drivers are able to agree on how to tune their parameters in order to operate according to the selected FSC, the FSC is activated at step 612. Otherwise, the FSC is refused and a new FSC is selected at step 604, if there is still an available FSC.

Figure 7:
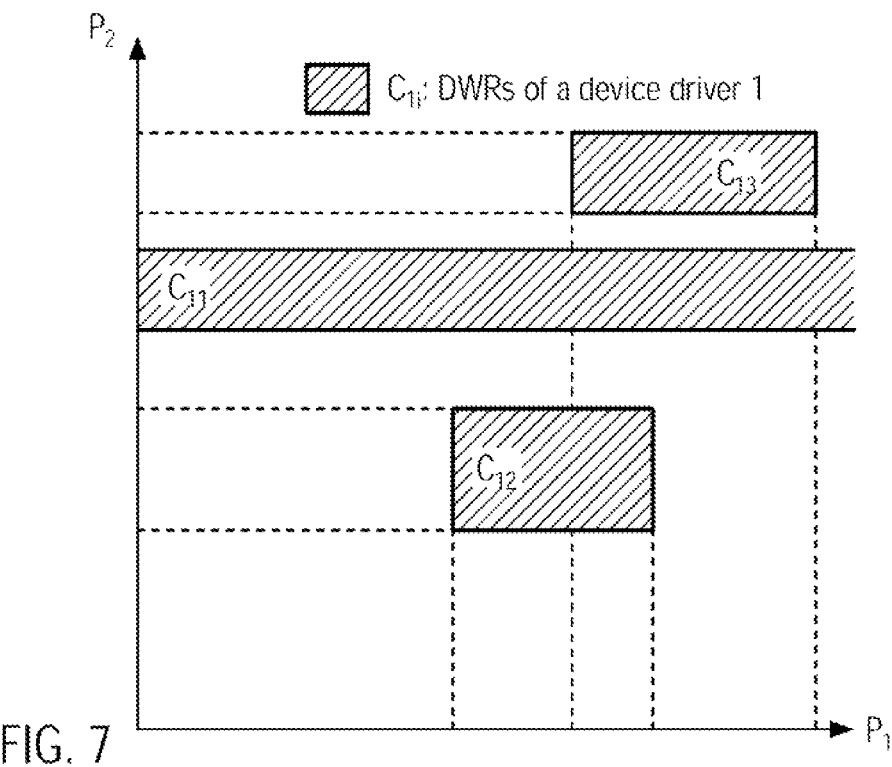
FIG. 7 is a diagram illustrating the identification of device working regions of a device driver in a multi-dimensional parameter space, according to an embodiment.

Turning now to FIG. 7, the registration of device working regions (DWRs) for a given device driver in a multi-dimensional parameter space is illustrated, according to an embodiment. As an example of multi-dimensional parameter space, a two-dimensional space defined by parameters $P_1$ and $P_2$ is shown on FIG. 7, where $P_1$ and $P_2$ are the two SWMs of the system. The same two-dimensional parameter space will be used throughout FIGS. 7 to 10 to illustrate several steps of the embodiments described above in relation to FIGS. 3 to 6. In the example of FIG. 7, one single device driver with three different operating modes is considered. The operating modes may be defined as regions within the two-dimensional parameter space, which are called DWRs $C_{11}$, $C_{12}$ and $C_{13}$ on FIG. 7. Each operating mode is defined by a range of allowed values for $P_1$ and/or $P_2$. A region may be defined by lower and upper bounds on one or more parameters of the multi-dimensional parameter space. For example, the regions $C_{12}$ and $C_{13}$ of FIG. 7 are bounded through an upper bound and a lower bound for both parameters $P_1$ and $P_2$. However, the region $C_{11}$ is bounded by an upper and lower bound on the parameter $P_2$, but does not define any condition on, i.e., is independent of the value of parameter $P_1$.

The parameters $P_1$ and $P_2$ are called system-wide metrics (SWMs) in a general way. They abstract several system resources as discussed above in the definition of the SWMs. As detailed above, two types of SWMs are considered as parameters in the multi-dimensional parameter space: the abstract system-wide metrics (ASMs), which are use-case dependent and exposed to the application level, like the ambient light level, the noise level, or the power source of the platform. The other type of parameters is called platform system-wide metrics (PSMs). The PSMs are architecture dependent and specific to the platform on which the hardware/software of the computer system is deployed. Examples of PSMs are system latency, bandwidth on hardware buses or on network interfaces.

Figure 8:
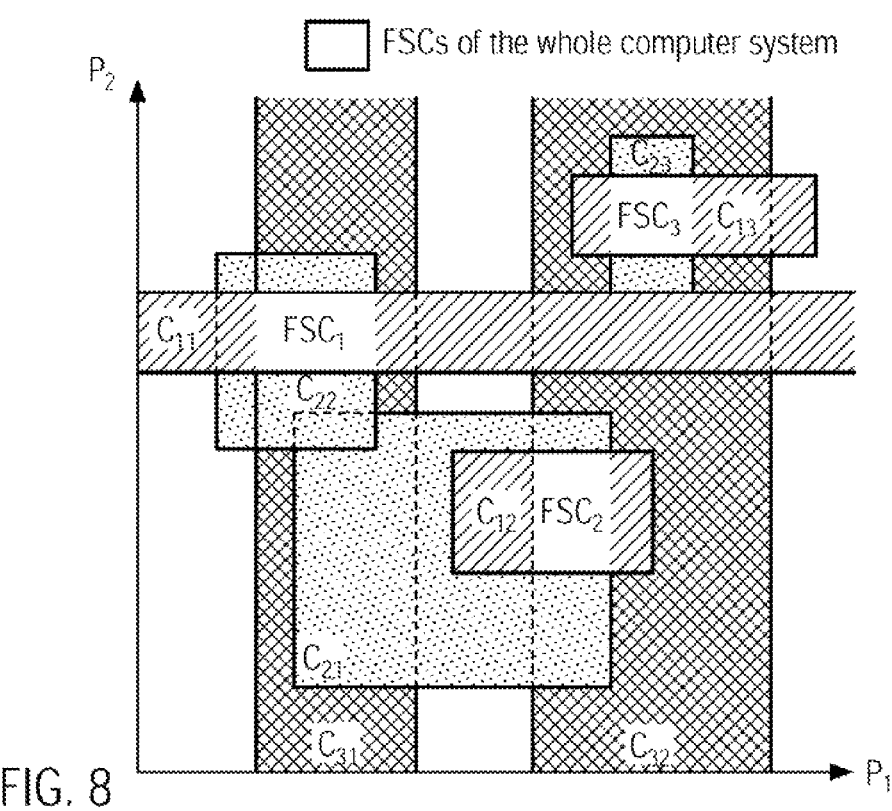
FIG. 8 is a diagram illustrating the identification of feasible system configurations in a multi-dimensional parameter space, according to an embodiment.

Turning now to FIG. 8, a similar diagram is shown where the DWRs of three different device drivers are superposed on the same diagram. The different types of shading correspond to the different device drivers. In detail, a first device driver, which is the same as the one used in the example of FIG. 7, has three operating modes corresponding to the three DWRs $C_{11}$, $C_{12}$ and $C_{13}$. A second device driver has also three operating modes illustrated by the DWRs $C_{21}$, $C_{22}$ and $C_{23}$. Finally, a third device driver has only two operating modes which only impact on the parameter $P_1$ and which are illustrated by the DWRs $C_{31}$ and $C_{32}$. By superposing all the DWRs of each driver on the same diagram in the same multi-dimensional parameter space, it becomes possible to determine where at least one operating mode of each of the device drivers is compatible with other operating modes of other device drivers. Indeed, as can be seen on FIG. 8, it is possible to identify operating modes which are valid for all the drivers of the system at the intersection of the DWRs $\{C_{11}, C_{22}, C_{31}\}$, $\{C_{12}, C_{21}, C_{32}\}$ and $\{C_{13}, C_{23}, C_{32}\}$. In a more general way, in an embodiment, the power manager 104 which has been described above in relation to the previous figures may determine which are the ranges of values within the multi-dimensional parameter space which are compatible with at least one DWR of each of the registered device drivers. These identified regions which correspond to an operating mode available for the whole system, defined in terms of ranges of values for the parameters of the multi-dimensional parameter space, are called feasible system configurations (FSCs) of the whole computer system. In the example of FIG. 8, three FSCs are identified at the intersections of the device working regions mentioned above.

Figure 9:
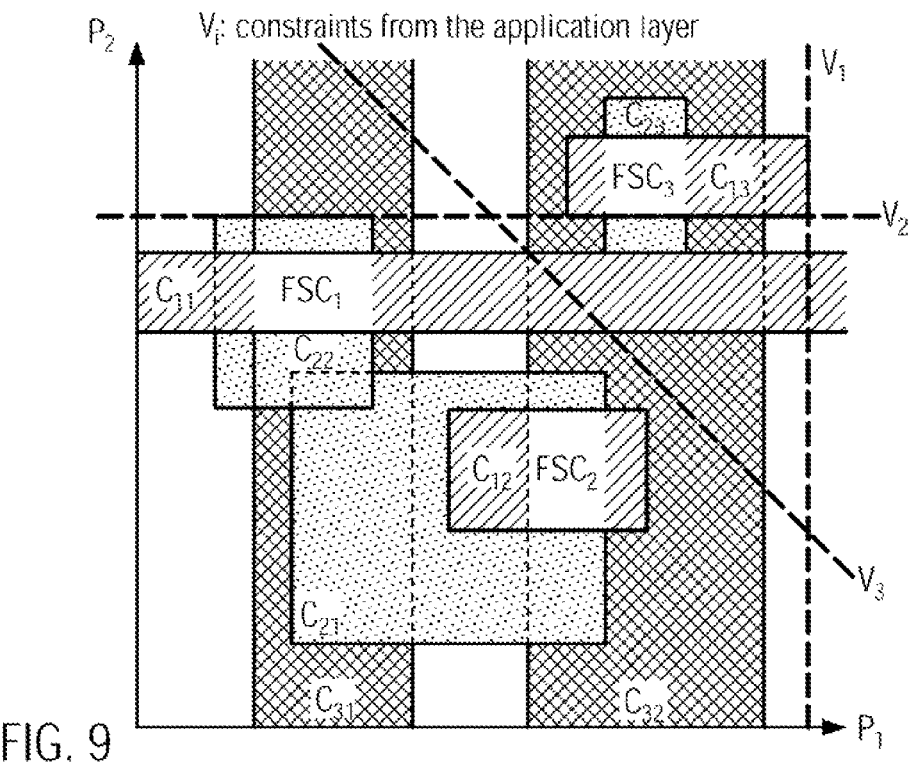
FIG. 9 is a diagram illustrating a step of applying constraints from an application layer in a multi-dimensional parameter space, according to an embodiment.

Turning now to FIG. 9, it shows the same diagram as FIG. 8 with the same three device drivers having the same DWRs, where the same FSCs have been identified. It further shows three constraints $V_1$, $V_2$ and $V_3$ which have been retrieved from the application layer, and are defined in the same multi-dimensional parameter space. In an embodiment, the constraints $V_1$, $V_2$ and $V_3$ shown on FIG. 9 are already aggregated constraints, each of them taking into account one or more constraints retrieved from the application layer. The corresponding constraints may have been aggregated according to an addition of several constraints or a minimum/maximum function of a plurality of constraints, as discussed in detail above. FIG. 9 shows how the aggregated constraints are applied in the multi-dimensional parameter space and how they are used to exclude one of the previously identified FSCs: in the example of FIG. 9, the three constraints $V_1$, $V_2$ and $V_3$ are upper bounds on $P_1$, $P_2$ and a combination of $P_1$ and $P_2$, respectively, and these constraints clearly exclude the feasible system configuration called $FSC_3$. However, it is also clear from these constraints that $FSC_1$ and $FSC_2$ are still available configurations which comply with all the aggregated constraints coming from the application layer. Applying these constraints for determining which identified FSCs comply with the retrieved aggregated constraints corresponds to steps 312 and 410 of FIGS. 3 and 4, respectively.

Figure 10:
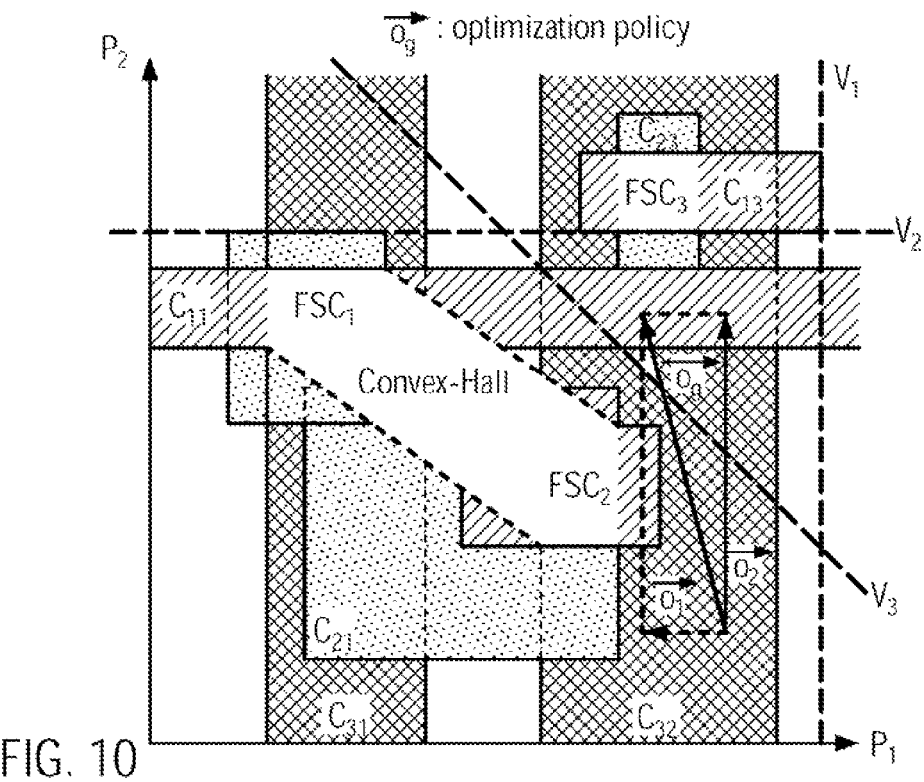
FIG. 10 is a diagram illustrating a step of weighting feasible system configurations according to an optimization policy in a multi-dimensional parameter space, according to an embodiment.

Turning finally to FIG. 10, it shows all aspects of FIG. 9 in the same multi-dimensional parameter space, and further shows details on a global optimization policy 106 which is represented by the vector $O_g$ of FIG. 10. As discussed in detail above, the optimization policy allows sorting the identified FSCs in view of given requirements. The vector $O_g$ shows that the requirements of a specific optimization policy can also be represented in the multi-dimensional parameter space, where the components $O_1$ and $O_2$ show both a direction of ordering of the FSCs along a given parameter and a weighting of the parameters. For example, the component $O_1$ in FIG. 10 shows that for the policy defined by the vector $O_g$, lower values of $P_1$ are better than greater values and component $O_2$ shows that greater values of $P_2$ are better than lower values of $P_2$. Furthermore, the fact that $O_2$ is longer than $O_1$ shows that a more important weight is given to parameter $P_2$ in comparison to parameter $P_1$ (given the fact that the scales used for $P_1$ and $P_2$ in the diagrams of FIGS. 7 to 10 are comparable). According to the policy defined by the example vector $O_g$ of FIG. 10, the FSCs would therefore be sorted in the order $FSC_3$, $FSC_1$, $FSC_2$, where $FSC_3$ would be the highest ordered FSC. However, according to the embodiments described above in relation to FIGS. 3 to 6, the highest FSC which could comply with the constraints $V_1$, $V_2$ and $V_3$ would be $FSC_1$ in the example of FIG. 10. Therefore, the three device drivers may be notified by the power manager that $FSC_1$ is the selected FSC, and may then tune their internal parameters in a way which allows them to operate in the region defined by $FSC_1$.

As in linear programming, which is a mathematical method for determining a way to achieve optimization for some list of requirements represented by linear equations, it is possible to define a Convex Hall including solutions of the optimization problem, as shown in FIG. 10. However, as the problem to be solved by the embodiments relates to discrete linear programming, discrete values of the parameters have to be found which allow the device drivers to operate in a given, "discrete" operating mode. Therefore, only part of the convex hall shown on FIG. 10, i.e., the regions $FSC_1$ and $FSC_2$, are true solutions of the optimization problem. Solving the optimization problem in an exact way is rendered possible by the first steps of the method which allow identifying all the FSCs of the computer system, so that a single solution (i.e., an FSC selected according to a global optimization policy $O_g$) may be selected and sent to the device drivers, thus commanding them to work in a specific operating mode, in a way which will provide a system-wide optimization reflecting the requirements of the global optimization policy.

Describing again the meaning of vector $O_g$ in terms of performance optimization, and generalizing the example of FIG. 10, it is to be understood that performance optimization is defined by assigning a weight to each SWM, i.e., to each parameter of the multi-dimensional parameter space. If a parameter is given a weight greater than the other ones, it means that one chooses to optimize this parameter with respect to the other ones. For example, in the case of FIG. 10, $P_2$ is optimized with respect to $P_1$. The weights of all parameters may be combined to define the vector $O_g$ which identifies an optimization direction. This optimization direction may be used to associate a performance index to each FSC, which is used for sorting the FSCs according to the global optimization policy.

Energy optimization, on the other hand, may be performed in one embodiment by characterizing each FSC with a measure of a corresponding power consumption of the whole system. This allows sorting the FSCs in another way, according to a power index. Both power and performance indexes may be combined and used to tune a system-wide optimization policy which selects, among those not invalidated by some constraints, the best FSC in which the system should operate. Once the optimal FSC has been identified, in an embodiment, the corresponding DWRs may be notified as to each device's local optimization policy and this information may be used as a tuning input for the local policy which grants all system requirements and platform specific interdependencies.

The embodiments described herein may be applied to embedded System on Chip (SoC) platforms such as entertainment devices (set top boxes and gaming consoles) and battery-powered mobile devices (mobile phones, PDA, GPS localization devices and GPS navigators, digital cameras, portable multimedia players, handhelds in general, and the like), as well as to any other type of computer system as defined above, including netbooks, laptops, desktops, workstations, servers, and the like.

In an exemplary embodiment, the embodiments described herein are applied to the embedded PNX-8500 SoC from Philips©. On this SoC, a plurality of peripherals may provide different performances if powered and clocked at different voltages and frequencies levels. The possible different combinations of voltages and frequencies for the various SoC's peripherals and interfaces are grouped in well defined analog processing elements, APE, states, named APE OPP (APE Operating Point). The selection of an APE OPP may automatically set all the voltages and frequencies levels for the entire APE. SWMs and DWRs may be defined on the basis of the performances that each device or communication interface may provide in each APE OPP. An exemplary PSM is the APE OPP that must be selected. In an embodiment, a plurality of ASMs may be related to the performances requested/ensured to/by the system like the number of frames/sec that the graphic accelerator can/must elaborate or the baud rates that the various interfaces can/must ensure. In this example, requests for a minimum level of performance that must be ensured are retrieved from the user space, and these requests may be translated in an APE OPP selection. Embodiments allow aggregating the different performance's requests and choosing, according to an optimization policy, the optimum APE OPP to satisfy them.

As apparent from the above described embodiments, a power management system and method are provided having a number of advantages over conventional power management schemes.

In particular, embodiments may allow optimally managing the resources of a computer system and its power consumption considering the whole platform controlled by an Operating System (OS), by selecting the best or one of the best entire system configurations according to given QoS requirements.

Moreover, embodiments may take advantage of the fact that the device drivers have a detailed and precise knowledge of the hardware device that they control. The QoS requirements and expectations come from the application layer (also named "User space"). The "middle layer" power manager (at the level of the OS) may implement several global policies that aim at optimizing performances (with several levels and with respect to different metrics) and/or power consumption of the whole platform. According to an embodiment, a distributed control of resources may be implemented for reaching an optimal system-wide performance based on the distribution of the complexity on different drivers, where each driver provides only local control and can thus better exploit its detailed knowledge of the underlying device. Furthermore, as complexity is bound to each single device, the power manager described herein according to embodiments is very portable and flexible, because it does not require a comprehensive profiling and analysis of the entire platform when just a few changes are made in an application or in a hardware component. This also improves maintainability and ease of integration of the power management in new computer systems, since a lot of device drivers may be reused on different platforms and since the application-level interface for a given OS is platform independent, so that the user space may be integrated in a portable way.

A further advantage of the power management according to embodiments described herein is to use optimization policies at two layers: device drivers provide their own local policy for optimizing power saving or performances locally, being related to the single sub-system they are responsible for, whereas a platform policy, embodied in the middle layer power manager, is a global optimization policy which aims at optimizing the entire system considering all the different contributions of the subsystems. The platform policy is dynamic, and may be changed at run-time to better fit the current status of the resources (e.g., the power status of the battery), and the requirements of applications currently running on the system. For example, if the battery capacity level is high, a high performance policy may be loaded, while when the level becomes low, the system may act in low-power mode with reduced resources.

In an embodiment, the retrieving of QoS requirements and expectations from an application layer is not invasive: it does not require modifying existing applications, since it may be done with proper instrumentation of common libraries or by analysis of messages exchanged by applications on a software basis. However, in another embodiment, custom or new applications may be written to support directly this approach.

Embodiments allow exploiting all-low-power capabilities of modern hardware chips. The methods and systems described above, relating to several embodiments, may be accelerated in hardware.

In summary, the embodiments described above provide at least the advantages of having a system-wide optimization of both performances and power consumption of the system, where dynamic policies are used, and where a power manager at a middle layer provides a portable, flexible and maintainable system for managing power consumption and system resources.

In an embodiment, a system that employs an optimization policy, such discussed above, may include at least two integrated circuits (ICs), where at least one of the ICs may be a processor or controller, and where the ICs may be disposed on the same or different IC dies. Other examples of the ICs include imagers (pixel arrays) and memories.

While the embodiments have been described with respect to the physical embodiments constructed in accordance therewith, it will be apparent to those skilled in the art that various modifications, variations and improvements of the embodiments may be made in the light of the above teachings and within the content of the appended claims without departing from the spirit and intended scope of the embodiments. In addition, those areas in which it is believed that those of ordinary skill in the art are familiar have not been described herein in order not to unnecessarily obscure the embodiments described herein. Accordingly, it is to be understood that the embodiments are not to be limited by the specific illustrative embodiments.

What is claimed is:

1. A computer-implemented method, the method comprising:
retrieving a set of regions in a multidimensional parameter space, each region relating to an operating mode of at least one of a plurality of device drivers;
identifying one or more sub-regions of said regions in said multidimensional parameter space, the sub-regions relating to operating modes of all the device drivers in the plurality;
retrieving a set of constraints from an application layer of the computer system, the constraints being defined in said multidimensional parameter space;
determining sub-regions, among the one or more identified sub-regions, complying with the set of constraints;
selecting one of the determined sub-regions to specify parameters for the plurality of device drivers to operate; and
notifying the plurality of device drivers of the selected sub-region.

2. The method of claim 1, further comprising applying, by each device driver of the plurality, an operating mode corresponding to the selected sub-region by tuning a set of tuneable parameters to values which correspond to the selected sub-region.

3. The method of claim 1, further comprising aggregating the retrieved constraints prior to determining sub-regions complying with the retrieved constraints, and wherein the step of determining sub-regions complying with the retrieved constraints comprises determining sub-regions complying with the aggregated constraints.

4. The method of claim 3, wherein constraints of a first type defined as a function of identical parameters in the multidimensional parameter space and which are not in competition for system resources to be shared are aggregated with a maximum function or a minimum function.

5. The method of claim 3, wherein constraints of a second type defined as a function of identical parameters in the multidimensional parameter space and which are in competition for system resources to be shared are aggregated by summing the constraints of the second type together.

6. The method of claim 1, further comprising ordering, by the power manager, the determined sub-regions according to an optimization policy, and wherein the step of selecting one of the determined sub-regions comprises selecting a highest ordered sub-region according to the optimization policy.

7. The method of claim 1, further comprising ordering, by the power manager, the identified one or more regions according to an optimization policy prior to retrieving the set of constraints, and wherein the step of selecting one sub-region comprises selecting a highest ordered sub-region according to the optimization policy.

8. The method of claim 7, wherein the optimization policy defines an ordering of the identified one or more regions according to quality of service requirements.

9. The method of claim 7, wherein the optimization policy defines an ordering of the identified one or more regions according to power consumption optimization.

10. The method of claim 7, wherein the optimization policy defines an ordering of the identified one or more regions according to a trade-off between quality of service requirements and power consumption optimization.

11. The method of claim 1, wherein the set of constraints from an application layer of the computer system are quality of service requirements from one or more running applications, from common libraries and/or from software busses.

12. A non-transitory computer-readable medium, the non-transitory computer-readable medium comprising computer-executable instructions for:
   retrieving a set of regions in a multidimensional parameter space, each region relating to an operating mode of at least one of a plurality of device drivers;
   identifying one or more sub-regions of said regions in said multidimensional parameter space, each sub-region being at an intersection of a given plurality of regions of the set of regions, each given plurality of regions including at least one region for each device driver of the plurality of device drivers;
   retrieving a set of constraints from an application layer of the computer system, the constraints being defined in said multidimensional parameter space;
   aggregating the retrieved constraints;
   determining sub-regions, among the one or more identified sub-regions, complying with the aggregated constraints;
   selecting one of the determined sub-regions according to an optimization policy; and
   notifying the plurality of device drivers of the selected sub-region to specify parameters for the plurality of device drivers to operate.

13. The method of claim 12, wherein the optimization policy defines an ordering of the identified one or more regions according to quality of service requirements.

14. The method of claim 12, wherein the optimization policy defines an ordering of the identified one or more regions according to power consumption optimization.

15. The method of claim 12, wherein the optimization policy defines an ordering of the identified one or more regions according to a trade-off between quality of service requirements and power consumption optimization.

16. A system, comprising:
   a plurality of device drivers, each device driver being adapted to notify to a power manager at least one region in a multidimensional parameter space, each region relating to an operating mode of at least one device driver; and
   the power manager, adapted to:
   identify one or more sub-regions of said regions in said multidimensional parameter space, the sub-regions relating to operating modes of all the device drivers in the plurality;
   retrieve a set of constraints from an application layer of the computer system, the constraints being defined in said multidimensional parameter space;
   aggregate the retrieved constraints;
   determine sub-regions, among the one or more identified sub-regions, complying with the aggregated constraints;
   select one of the determined sub-regions to specify parameters for the plurality of device drivers to operate; and
   notify the plurality of device drivers of the selected sub-region,
   wherein each device driver of the plurality is further adapted to apply an operating mode corresponding to the notified sub-region.

17. The method of claim 16, wherein the multidimensional parameter space has axes corresponding to a plurality of system parameters on which the plurality of device drivers impacts.

18. The method of claim 17, wherein the plurality of system parameters includes abstract system-wide metrics, ASMs, which are independent of hardware constraints of the computer system, and platform system-wide metrics, PSMs, which are related to the hardware constraints of the computer system.

19. The method of claim 18, wherein the ASMs include ambient light level, ambient noise level, power source of the computer system, and/or specific requirements of the one or more running applications.

20. The method of claim 18, wherein the PSMs include system latency, bandwidths of hardware busses, and/or bandwidths of network interfaces.

21. A computer system, comprising:
   at least one application configured to identify at least one constraint;
   at least one device configured to perform at least one function under control of the at least one application, the at least one device having working regions; and
   a power manager configured to cause the at least one device to operate in a working region that is within the at least one constraint.

22. The computer system of claim 21 wherein:
   the at least one application is disposed in a first logical layer;
   the at least one device is disposed in a second logical layer; and
   the power manager is disposed in a third logical layer.

23. The computer system of claim 21 wherein:
   the at least one device has working regions within which it may perform the function; and
   the power manager is configured to cause the at least one device to operate in one of the working regions that is within the at least one constraint.

24. A computer system, comprising:
   at least one application configured to identify at least one constraint;
   at least one device configured to perform at least one function under control of the at least one application; and
   a power manager configured to cause the at least one device to operate within the at least one constraint;
   wherein the power manager is configured:
   to map working regions of the at least one device to at least one system metric;
   to determine at least one possible working region of the at least one device that is compatible with the at least one constraint; and
   to cause the at least one device to operate according to the at least one working region.

25. A computer system, comprising:
   at least one application configured to identify at least one constraint;
   at least one device configured to perform at least one function under control of the at least one application; and
   a power manager configured to cause the at least one device to operate within the at least one constraint;
   further comprising:
   multiple devices each configured to perform at least one function under control of the at least one application and each having at least one working region; and
   wherein the power manager is configured:
   to map working regions of the devices to at least one system metric;

to determine groupings of the working regions of the devices that are compatible with the at least one constraint; and to cause the devices to operate according to one of the groupings.

26. A computer system, comprising:

at least one application configured to identify at least one constraint;

at least one device configured to perform at least one function under control of the at least one application; and a power manager configured to cause the at least one device to operate within the at least one constraint;

further comprising:

multiple devices each configured to perform at least one function under control of the at least one application and each having at least one working region; and wherein the power manager is configured:

to map working regions of the devices to at least one system metric;

to determine groupings of the working regions of the devices that are compatible with the at least one constraint;

to order the groupings according to a level of performance relative to the one system metric; and to cause the devices to operate according to the one of the groupings that has a highest level of performance.

27. A computer system, comprising:

at least one application configured to identify at least one constraint;

at least one device configured to perform at least one function under control of the at least one application; and a power manager configured to cause the at least one device to operate within the at least one constraint;

further comprising:

multiple devices each configured to perform at least one function under control of the at least one application and each having at least one working region; and wherein the power manager is configured:

to map working regions of the devices to at least one system metric;

to determine possible groupings of the working regions of the devices;

to order the groupings according to a level of performance relative to the one system metric;

to determine which of the groupings are compatible with the at least one constraint; and to cause the devices to operate according to the one of the compatible groupings that has a highest level of performance.

28. A computer system, comprising:

at least one application configured to identify at least one constraint;

at least one device configured to perform at least one function under control of the at least one application; and a power manager configured to cause the at least one device to operate within the at least one constraint;

further comprising:

multiple devices each configured to perform at least one function under control of the at least one application and each having at least one working region; and wherein the power manager is configured:

to map working regions of the devices to at least one system metric;

to determine possible groupings of the working regions of the devices;

to order the groupings according to a level of performance relative to the one system metric;

to store the order of the groupings;

to determine which of the groupings are compatible with the at least one constraint; and to cause the devices to operate according to the one of the compatible groupings that has a highest level of performance.

29. A computer system, comprising:

at least one application configured to identify at least one constraint;

at least one device configured to perform at least one function under control of the at least one application; and a power manager configured to cause the at least one device to operate within the at least one constraint;

further comprising:

multiple applications each configured to identify at least one respective operating constraint of a same type; and wherein the power manager is configured:

to aggregate the operating constraints; and to cause the at least one device to operate within an aggregate of the operating constraints.

30. The computer system of claim 21, further comprising at least one device driver configured to cause the at least one device to perform at least one function under control of the at least one application.

* * * * *